(12) United States Patent
Schroath et al.

(10) Patent No.: US 7,268,923 B2
(45) Date of Patent: Sep. 11, 2007

(54) DOCUMENT SCANNER FOR SCANNING BOOKS

(75) Inventors: Leonard Schroath, Boise, ID (US); Brad Anderson, Boise, ID (US); Bruce L. Johnson, Woodinville, WA (US); Bill Herrmann, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 971 days.

(21) Appl. No.: 10/376,432

(22) Filed: Feb. 28, 2003

(65) Prior Publication Data

US 2004/0169894 A1  Sep. 2, 2004

(51) Int. Cl.
*H04N 1/04* (2006.01)
*G03G 15/00* (2006.01)

(52) U.S. Cl. .................. 358/474; 358/497; 358/493; 399/362

(58) Field of Classification Search .............. 358/474, 358/497, 493; 399/362, 379, 380
See application file for complete search history.

(56) References Cited

U.S. PATENT DOCUMENTS

| | | | |
|---|---|---|---|
| 4,574,316 A | 3/1986 | Wilman et al. | |
| 5,475,505 A | 12/1995 | Minasian et al. | |
| 5,712,718 A | 1/1998 | Chen | |
| 5,751,446 A * | 5/1998 | Fujioka | 358/474 |
| 5,751,461 A * | 5/1998 | Chen et al. | 359/201 |
| 5,847,846 A * | 12/1998 | Wu et al. | 358/475 |
| 5,875,042 A * | 2/1999 | Kashitani et al. | 358/474 |
| 5,903,364 A * | 5/1999 | Shih-Min | 358/498 |
| 6,313,954 B1 | 11/2001 | Tai | |
| 6,459,510 B1 * | 10/2002 | Brewer et al. | 358/497 |
| 6,603,580 B1 * | 8/2003 | Taillie | 358/474 |

FOREIGN PATENT DOCUMENTS

| | | |
|---|---|---|
| JP | 62107569 | 5/1987 |
| JP | 04030154 | 2/1992 |
| JP | 05019371 | 1/1993 |
| JP | 2000165608 | 6/2000 |

* cited by examiner

*Primary Examiner*—Jerome Grant
*Assistant Examiner*—Houshang Safaipour

(57) ABSTRACT

A document scanner for scanning an open book includes a housing and a wedge-shaped transparent platen supported by the housing. The platen defines an upper surface configured to support a book in a face-down position, and a lower surface opposite the upper surface. The platen includes a first platen portion and a second platen portion joined at a vertex to thereby define the wedge-shape of the platen. The document scanner further includes a scan head moveably supported by the housing. The scan head is configured to move generally parallel to the first platen portion and the second platen portion.

13 Claims, 10 Drawing Sheets

DOCUMENT SCANNER FOR SCANNING BOOKS

BACKGROUND

Document scanners are well known and are used to optically scan documents and other media in order to capture a facsimile of the object being scanned. The captured facsimile of the scanned object can then be replicated (such as in a photocopying process) or stored in a computer readable memory in the form of an image file so that the image file can be later replicated in hard-copy form, viewed on a screen, or manipulated via a computer. The optical scanning process used to capture the facsimile of the object being scanned can be an analog process, such as is commonly used in electrophotographic copying machines. More commonly, the document scanning process is a digital process, such as in the case of a "flatbed scanner", so-called because a transparent flat platen or "bed" is used to receive and support the object being scanned during the scanning process. A flatbed scanner is typically used in conjunction with a personal computer or the like. In a digital scanning process, a light source is passed across the object being scanned, and light is reflected from the object being scanned. In an analog scanning process, the reflected light is received by an optical photoconductor ("OPC"), which can then be placed in contact with an imaging substance, such as a dry toner. The toner will be selectively attracted to or repelled from the OPC according to the exposure from the reflected light, and toner attracted to the OPC can then be transferred to imaging media such as paper or the like. In a digital optical scanning process, the light reflected from the scanned object is typically received by a charge coupled device ("CCD") array. The CCD array provides an analog output signal representative of reflected light received from the object being scanned, and the analog output signal can then be converted to a digital signal via an analog-to-digital converter. The digital signal can then be stored in a computer readable memory for later use, as described above.

Optical document scanners typically include a housing which supports the platen, and a scan head. The platen defines an upper surface and a lower surface, and the object to be scanned is placed on the upper surface of the platen. The scan head is then configured to move across, and in proximity to, the lower surface of the platen to thereby allow the object placed on the upper surface of the platen to be scanned. The scan head typically includes a light source to illuminate the object being scanned, one or more mirrors to direct reflected light from the object being scanned to a final source (either an OPC of a CCD array), and a lens to focus the reflected light. (However, in certain configurations one or more of the mirrors, and the lens, can be placed elsewhere within the housing of the scanner, but in optical communication with the light source). The light source, mirrors, lens and final source are positioned to ensure that light reflected from the object being scanned is directed to the final source. Typically, the optical components (light source, mirrors, lens and final source) are fixed in their positions. The optical scanning process thus relies on the object to be scanned being placed on the platen in parallel orientation with the upper surface of the platen. If the object to be scanned is not parallel to the upper surface of the platen, then light from the light source will be reflected from the object at an angle other than the predetermined angle which is set to ensure that the reflected light is ultimately received by the final source. For flat objects to be scanned (such as a single sheet of paper), document scanners work very well. However, not all objects that a user desires to scan can be placed in parallel orientation to the upper surface of the platen. One particular example where this is so is in the case of a book. Frequently, a book cannot be laid on a platen so that the entirety of the pages to be scanned are in parallel orientation with the platen, or even in contact with the platen.

Turning to FIG. 1, a document scanner 10 of the prior art is depicted schematically in a side view, showing the relevant components of the scanner 10. The scanner 10 includes a housing 12 which supports a flat transparent platen 14. The platen 14 is defined by an upper surface 14U and a lower surface 14L. The scanner 10 includes a scan head 16 which is configured to be moved in direction "X" across the underside 14L of the platen 14 in order to perform the scanning process. The scan head 16 is guided by a scan head track 18, and is moved along the track by a motive means (not shown, but typically including a drive belt or cable which pulls the scan head 16 in direction "X"). The scan head 16 includes a light source 20 and a reflected light receptor 22. The reflected light receptor 22 can be a mirror, lens, or final source, as described above. The scanner 10 can also be provided with a cover 24, which is typically used to cover the object to be scanned so that during the scanning process incident light does not intrude into the platen 14, thus affecting the quality of the final scanned image. The scanner cover 24 can be supported by a flexible hinge 26 which allows the scanner cover to move upwards in direction "Z". In this way, the scanner cover 24 allows the platen 14 to receive relatively thick objects to be scanned that would otherwise prevent the scanner cover 24 from being placed over the object if the scanner cover were simply hinged to the scanner body 12 by a simple hinge.

As depicted in FIG. 1, a book "B" has been placed on the upper surface 14U of the platen 14. The book "B" has been placed on the platen 14 so as to present pages "P1" and "P2" to the scan head 16 as the scan head moves in direction "X" across the underside 14L of the platen 14. The book "B" includes a cover "CO", which defines a spine "S" of the book, where the pages of the book are joined to the cover "CO". As can be seen, the spine "S" of the book "B" forces the pages "P1" and "P2" to curve upwards, away from the upper surface 14U of the platen 14 in a crease area "C". As can also be seen, the portion of the pages "P1" and "P2" of the book "B" in the crease area "C" are not oriented in parallel arrangement to the upper surface 14U of the platen 14. Accordingly, light reflected from the portion of the pages "P1" and "P2" in the crease area "C" will likely not be reflected to the light receptor 22, resulting in loss of scanned data from the crease area "C". Further, since the portion of the pages "P1" and "P2" in the crease area "C" are moved away from the platen 14, the illumination of the pages by the light source 20 in the crease area "C" may not be sufficient to allow a decent image to be captured. Even when there is sufficient illumination of the crease area "C" by the light source 20, and the reflected light from the crease area "C" is received by the receptor 22, the captured image in the crease area "C" will be distorted, generally resulting in compaction of the image in the crease area "C". The problem is particularly acute for very thick books, and more so when the text on the pages to be imaged intrudes deep into the crease area "C". Even for relatively thin books, if the cover "CO" and spine "S" are quite rigid, then text or images in the crease area "C" will not be imaged, or will be poorly imaged.

One solution to this problem is to "break" the spine "S" of the book "B" so that the book lies flatter on the platen 14. This is obviously undesirable since it will result in permanent damage to the book. Other prior solutions to this problem have been proposed, as follows.

Japanese patent JP05019371 provides for a document scanner having a wedge-shaped platen configured to receive an open book, and a scan head which moves in a rectilinear direction under the non-rectilinearly shaped platen. While this configuration accommodates the shape of an open book, it requires dual receptors to capture the reflected light from the scanned book (due to the fact that reflected light will be reflected by the book in opposite directions as the scan head crosses from the first page of the book to the adjacent second page of the book). Further, this configuration requires that light intensity from the light source be continually adjusted as the scan head moves under the book, since the distance from the pages of the book being scanned to the reflected light receptor will vary as a function of the distance from the leading edge of a page to the trailing edge of a page near the spine of the book. If no such light intensity adjustment is made, then the resulting image will not be evenly exposed, resulting in over exposure of some areas of the pages being scanned, and/or underexposure of other areas of the pages being scanned.

Japanese patent number JP2000165608 also addresses the problem of scanning an open book. The solution proposed by JP2000165608 is to provide a scanner having a two-part platen with the first and second portions arranged in a generally wedge-shape configuration to receive an open book. The scanning apparatus further requires first and second scan heads to separately scan each of the respective first and second portions of the platen. While this configuration is effective in allowing an open book to be scanned without significant loss of data in a crease area of the book, it requires complexity in the way of providing, and coordinating the operation of, two separate scan heads.

Japanese patent number JP62107569 likewise addresses the problem of scanning an open book by providing a scanner having a two-part platen with the first and second portions arranged in a generally wedge-shape configuration to receive the open book. However, in this configuration a single scan head is positioned to scan, in general parallel arrangement, only one of the two pages presented to the platen. In order to scan the second page of the open book, the book must be reoriented to allow the second page to be scanned by the single scan head. This operation requires a significant amount of user intervention, which is undesirable.

In other proposed solutions to the problem of scanning the pages of an open book, U.S. Pat. Nos. 5,475,505 and 5,712,718 provide for document scanners having a single platen which is configured to allow an open book to be placed at an extreme outside edge of the platen, thus allowing a single page of the book to be properly presented to the scan head for scanning. As with Japanese patent number JP62107569, this arrangement allows for a significant portion of the distortion and/or lost data from scanning an open book to be preserved for a single page of the open book, but again requires a user to reorient the book with respect to the platen to scan the second page of the open book.

One apparatus specifically configured for open book scanning is described in U.S. Pat. No. 4,574,316. This apparatus provides a cradle for cradling an open book in a face-up position. The cradle is adjustable to accommodate different degrees of spread between the opposing pages of the open book. An elevator moves the cradle upward so that one page of the open book is presented to a platen, and a scan head under the platen can then scan the page. In order to scan the opposing page, the cradle must be lowered and then rotated on a carousel, and then moved back in position against the platen. As can be seen, this apparatus requires a substantial number of steps to be performed to scan both pages of an open book.

Most of the prior art apparatus described above result in separate scans for each page of an open book, and thus separate printed copies for each page of the open book. However, in many instances a photocopy of both pages of an open book will fit on a single sheet of copy paper. The prior art solutions can thus substantially increase imaging media consumption.

One apparatus that allows both pages of an open book to be scanned with a single scan head is described in U.S. Pat. No. 6,313,954 B1. The apparatus described in that patent is a curved lens which is configured to be placed over the upper surface of a flatbed scanner platen. The lens is curved to receive a crease of an open book, and also to correct for distortion of the rendered image in the crease area. However, several such lenses can be necessary to accommodate different shapes of open books. Further, placing the lens on, and removing the lens from, the platen can result in the platen being scratched by the lens.

SUMMARY

One embodiment of the present invention provides for a document scanner for scanning an open book. The document scanner includes a housing and a wedge-shaped transparent platen supported by the housing. The platen defines an upper surface configured to support a book in a face-down position, and a lower surface opposite the upper surface. The platen includes a first platen portion and a second platen portion joined at a vertex to thereby define the wedge-shape of the platen. The document scanner further includes a scan head moveably supported by the housing. The scan head is configured to move generally parallel to the first platen portion and the second platen portion.

Another embodiment of the present invention provides for a document scanner having a housing and a transparent platen supported by the housing. The platen defines an upper surface and a lower surface, and includes a first platen portion, a second platen portion, and a platen vertex hinge. Each platen portion defines a mating edge, and the first and second platen portions are joined at the mating edges by the platen vertex hinge to thereby allow the mating edges of the first and second platen portions to move generally upward and away from the housing, thus placing the platen into a wedge-shape. The document scanner further includes a scan head moveably supported by the housing and configured to move generally parallel to the lower surface of the platen. A scan head track is supported by the housing and is configured to moveably support the scan head. The scan head track includes a first track portion, a second track portion, and a track hinge joining the first and second track portions. The scan head track can thus be placed in essentially parallel orientation to the lower surface of the platen.

A further embodiment of the present invention provides for a document scanner having a housing and interchangeable transparent first and second platens. Each platen is configured to be supported by the housing. The document scanner includes a scan head moveably supported by the housing, and a scan head track supported by the housing and configured to moveably support the scan head. The scan head track includes a first track portion, a second track portion, and a track hinge joining the first and second track portions. The first platen is a generally flat planar platen, and the second platen is a generally wedge-shaped platen.

These and other aspects and embodiments of the present invention will now be described in detail with reference to the accompanying drawings, wherein:

DETAILED DESCRIPTION

Representative embodiments of the present invention provide for a document scanner capable of scanning opposing first and second pages of an open book in a single scan, with little distortion to the resulting scanned image of the first and second pages of the book. The document scanner includes a wedge-shaped (or inverted "V"-shaped) platen having first and second platen portions that intersect at a vertex. The platen defines opposing upper and lower surfaces. The vertex is configured to receive a crease area of an open book, and the first and second platen portions are configured to support the respective first and second opposing pages of the open book on the upper surface of the platen. The scanner further includes a moveable scanning means, such as a scan head, which is configured to move along the lower surface of the platen in generally parallel orientation to the first and second platen portions. The scanner can further include a scanning support means, such as a scan head track, that moveably supports the scanning means in relative parallel orientation to the first and second portions of the platen. The scanner can also include a drive means configured to move the scanning means along the scanning support means.

Figure 1:
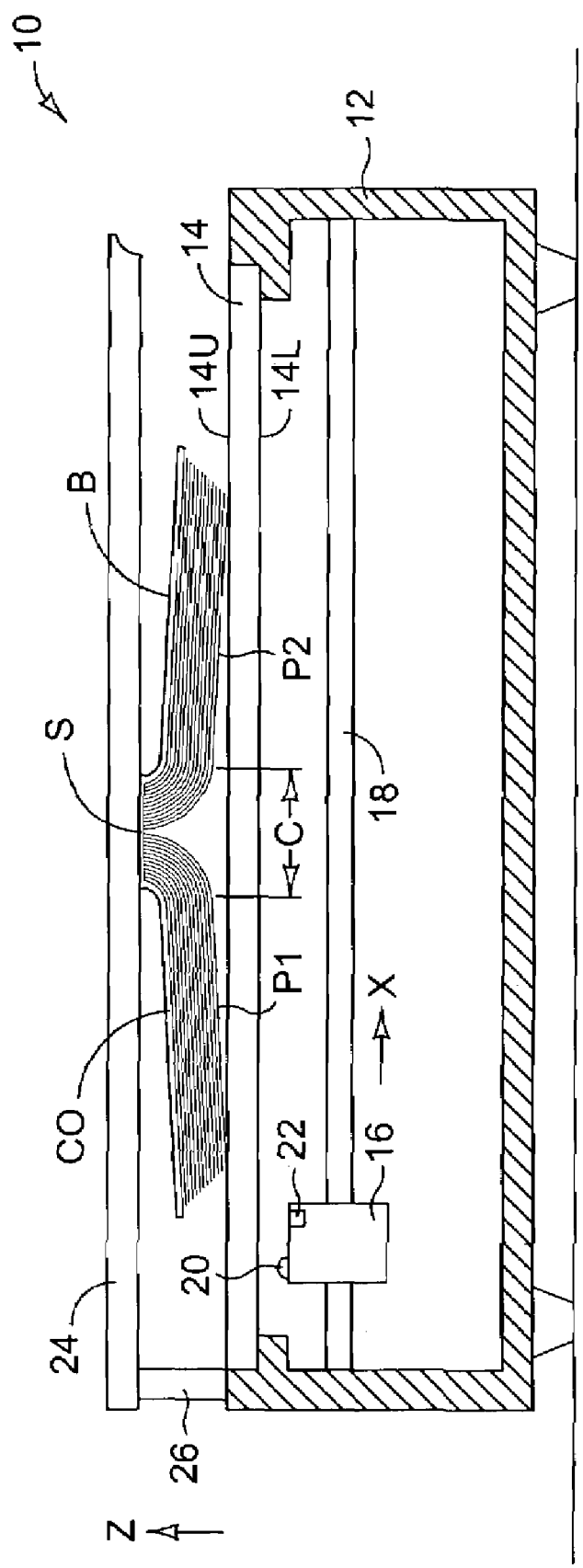
FIG. 1 is a side sectional diagram depicting a prior art flatbed scanner scanning an open book.
Figure 2:
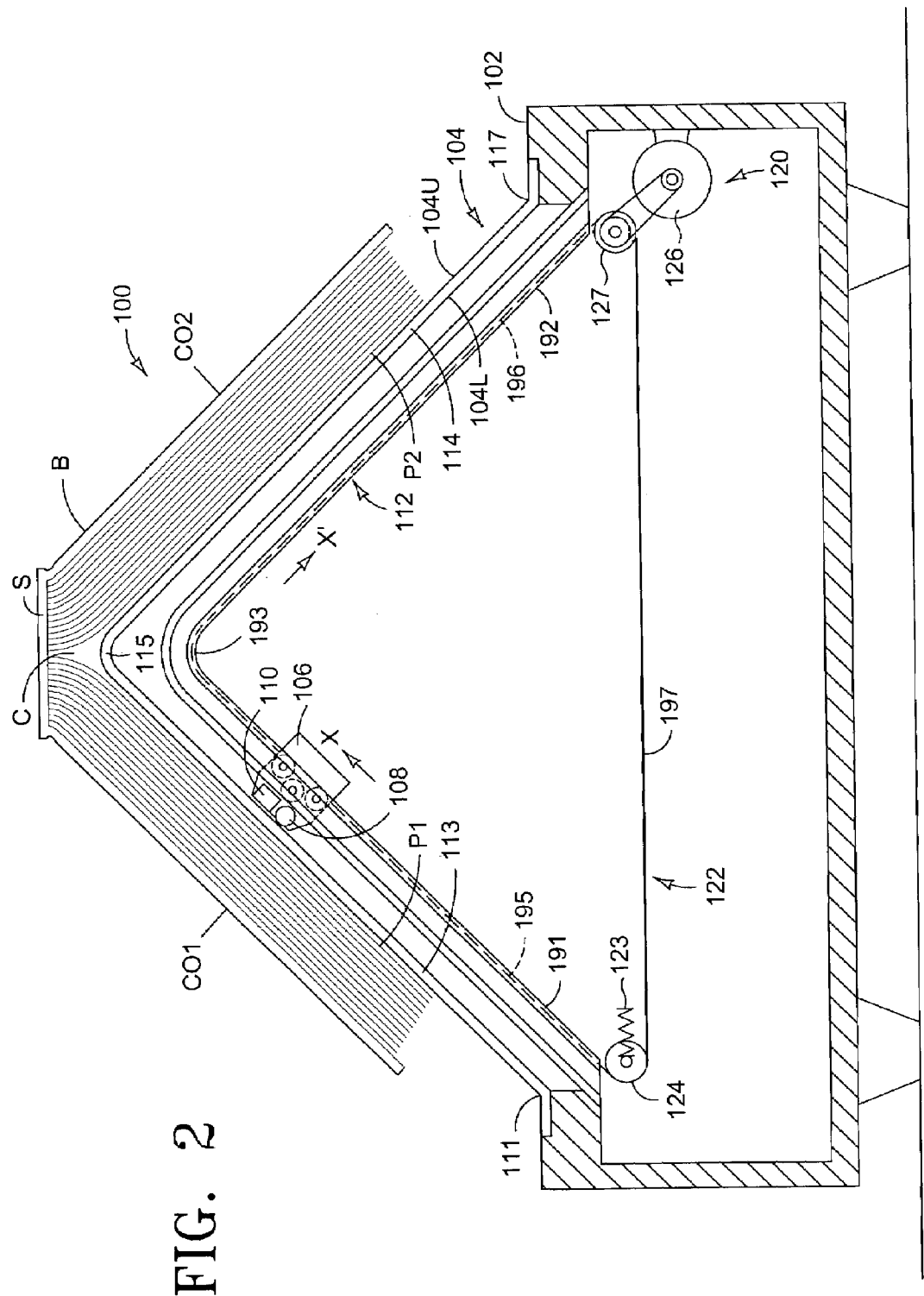
FIG. 2 is a side sectional diagram depicting a scanner configured to scan an open book, in accordance with one embodiment of the present invention.

Turning now to FIG. 2, a side sectional view of a scanner 100 in accordance with a first embodiment of the present invention is depicted. The scanner 100 includes a housing 102 and a wedge-shaped transparent platen 104 which is supported by the housing 102. The platen 104 defines an upper surface 104U which is configured to support a book "B" in a face-down position. The platen 104 further defines a lower surface 104L opposite the upper surface 104U. The platen 104 includes a first platen portion 113 and a second platen portion 114 joined at a vertex 115 to thereby define the wedge-shape of the platen 104. As can be seen, the vertex 115 of the platen 104 can receive a crease area "C" of the book "B", and the first and second portions 113, 114 of the platen 104 support the respective opposing first and second pages "P1" and "P2" of the book "B". The wedge-shape of the platen 104 thus presents little stress to the spine "S" of the book "B", as compared to the situation wherein the book is placed on a flatbed scanner (as depicted in FIG. 1).

In the scanner 100 of FIG. 2, the platen first portion 113 and the platen second portion 114 can intersect one another at the platen vertex 115 at an obtuse angle. This arrangement is particularly useful for scanning books that are relatively "thin" (meaning that the distance between the covers "CO1" and "CO2" of the book "B" are separated by a distance of about one inch (2.5 cm) or less when the book is in a closed position). In one variation, the first and second platen portions 113, 114 can intersect at the platen vertex 115 at an acute angle. This latter configuration is particularly useful for scanning relatively "thick" books (meaning that the distance between the covers "CO1" and "CO2" of the book "B" are separated by a distance of greater than about one inch (2.5 cm) when the book is in a closed position).

The scanner 100 further includes a scan head 106 which is moveably supported by the housing 102. The scan head 106 is configured to move generally parallel to the first platen portion 113 and the second platen portion 114. The scan head 106 includes a light source 108 and a receptor 110. The receptor 110 can include a mirror, a lens, a CCD array, or an OPC. The scan head 106 allows a facsimile of the pages "P1" and "P2" of the book to be generated. The scanner 100 can further include components typical to a document scanner, such as the electrical, electronic and mechanical components used to perform the scanning process. Since such components are well known, they are not depicted in FIG. 1 (except as otherwise described below) for the purpose of simplifying the figure.

As depicted in FIG. 2, the scan head 106 is configured to move firstly generally parallel to the first platen portion 113 in a first direction "X", and then, after moving past the vertex 115 of the platen 104, to move secondly generally parallel to the second platen portion 114 in a second direction X'. More specifically, the platen 104 defines a first end 111 and a second end 117, and the platen is supported by the housing 102 at the first and second ends of the platen. The vertex 115 of the platen 104 is generally parallel to the first and second ends 111, 117 of the platen. The scan head 106 is generally linear in shape, and is aligned generally parallel to the first and second ends 111, 117 of the platen 104.

The document scanner 100 further includes a scan head track 112 supported by the housing 102 and configured to moveably support the scan head 106. The scan head track 112 includes a first track portion 191, a second track portion 192, and a curved track vertex portion 193. The first and second track portions 191, 192 are joined together by the curved track vertex portion 193 to thus allow smooth movement of the scan head 106 over the entire length of the scan head track 112. The first and second track portions 191, 192 are generally parallel to the respective first and second platen portions 113, 114. In this way, the scan head 106 can perform a single scan of the first and second pages "P1", "P2" of the book "B" with minimal distortion to the resulting facsimile of the first and second pages, and in particular to the portion of the first and second pages in the crease area "C". The scan head track 112, and thus the movement of the scan head 106, generally corresponds to the wedge-shape of the platen 104. In this way the movement of the scan head 106 during a scanning process of an open book allows for the scan head 106 to produce a reasonably accurate facsimile of the pages "P1" and "P2" of the open book "B".

The document scanner 100 further includes a scan head drive assembly 120 which is supported by the housing 102. The scan head drive assembly 120 is configured to move the scan head 106 generally parallel to the first and the second platen portions 113, 114, as described above. As depicted in FIG. 2, the drive assembly 120 includes a drive cable 122 generally arranged in a triangular shape. A first and a second side (195, 196) of the triangle formed by the drive cable 122 are generally parallel to the respective first and second track portions 113, 114. A third side 197 of the drive cable is formed between the first and second sides 195, 196 of the drive cable 122. The vertices formed by the first, second and third sides (195, 196, 197) of the drive cable 122 are defined by drive cable pulleys 124 and 127 and the vertex portion 193 of the scan head track 112. The scan head 106 engages the drive cable 122, and drive cable pulley 127 is driven by a motor 126. A tensioner 123 can be added to cable pulley 124 to keep the drive cable 122 in tension to reduce undesirable movement of the scan head 106 as it moves along the scan head track 112. The drive assembly 120 thus provides a motive source to allow the scan head 106 to be moved along the scan head track 112, and to be returned to its initial position following the scanning process. The methods and apparatus specifically used to move a scan head along a scan head track, and returned to an initial position, via a scan head drive assembly are well known, and need not be described further herein.

The document scanner 100 further includes components (not shown) appropriate to a document scanner for recording an image scanned by the scan head 106. These components can include an OPC, a CCD array, electrical power supplies for the scan head 106 and the scan head drive assembly 120, electronics appropriate to managing the scanning process and recording the scanned image, user interfaces, and other well known components. These auxiliary components need not be described further herein, as their use is well known and understood in implementing document scanners.

Figure 3:
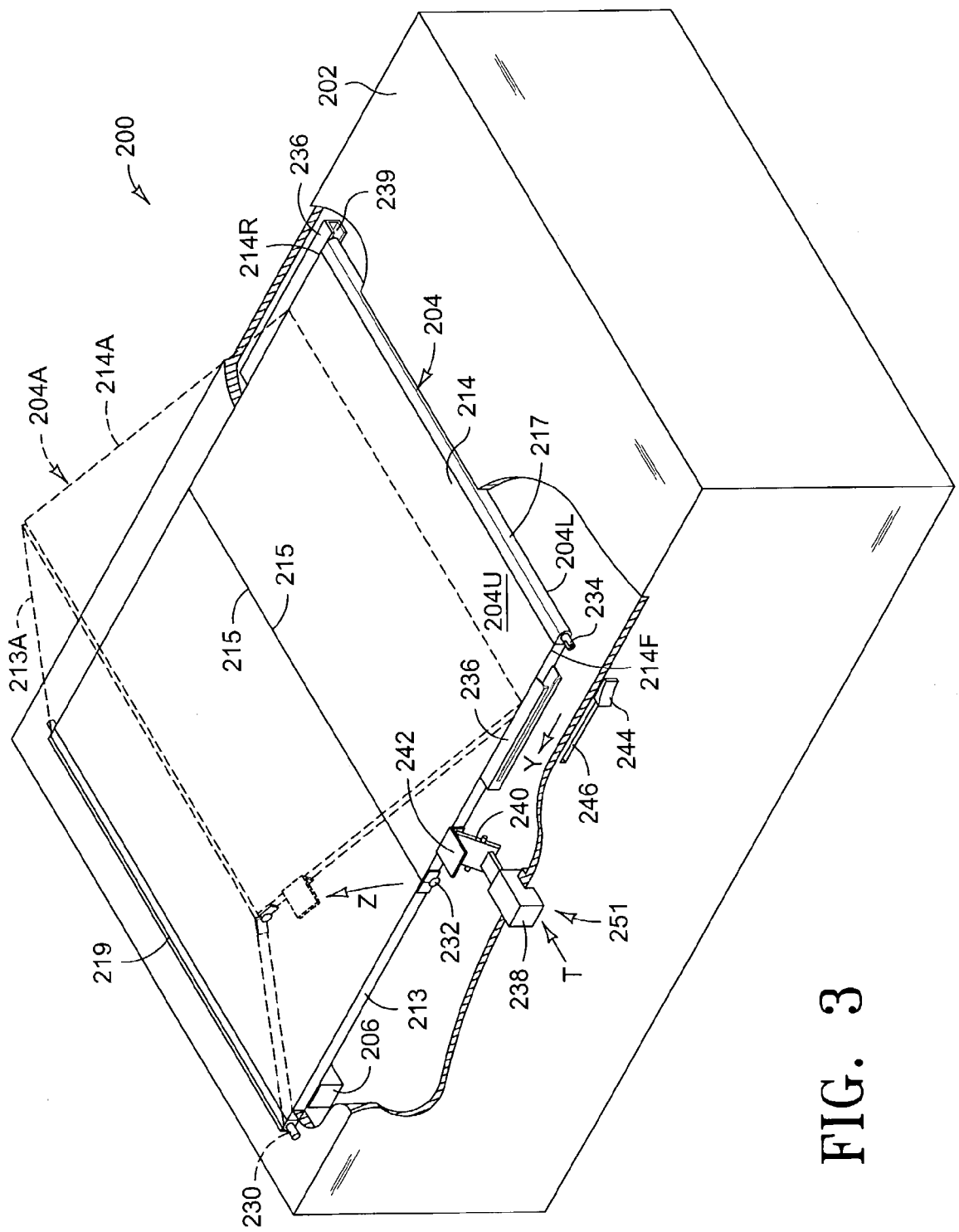
FIG. 3 is an isometric diagram depicting a scanner configured to scan an open book, in accordance with another embodiment of the present invention.

Turning now to FIG. 3, a second embodiment of a document scanner 200 in accordance with the present invention is depicted in a cut-away isometric diagram. The document scanner 200 includes a two-part platen 204 which can be repositioned from an essentially flat configuration (allowing scanning of essentially flat objects) to a wedge-shaped configuration (thus allowing scanning of an open book). FIG. 3 is an isometric diagram depicting the document scanner 200 having a housing 202. Certain components of the scanner 200 (which are described more fully below) have been omitted from FIG. 3 in order to facilitate visualization of the scanner 200. The document scanner 200 includes a transparent platen 204 supported by the housing 202 and defining an upper surface 204U and a lower surface 204L. The platen 204 includes a first platen portion 213, a second platen portion 214, and a platen vertex hinge 232. Each platen portion (213, 214) defines a mating edge 215, and the first and second platen portions (213, 214) are joined at the mating edges 215 by the platen vertex hinge 232 to thereby allow the mating edges of the first and second platen portions to move generally upward (i.e., in the direction indicated by arrow "Z") away from the housing 202. The document scanner 200 further includes a scan head 206 which is moveably supported by the housing 202 and is configured to move generally parallel to the lower surface 204L of the platen 204.

Figure 4:
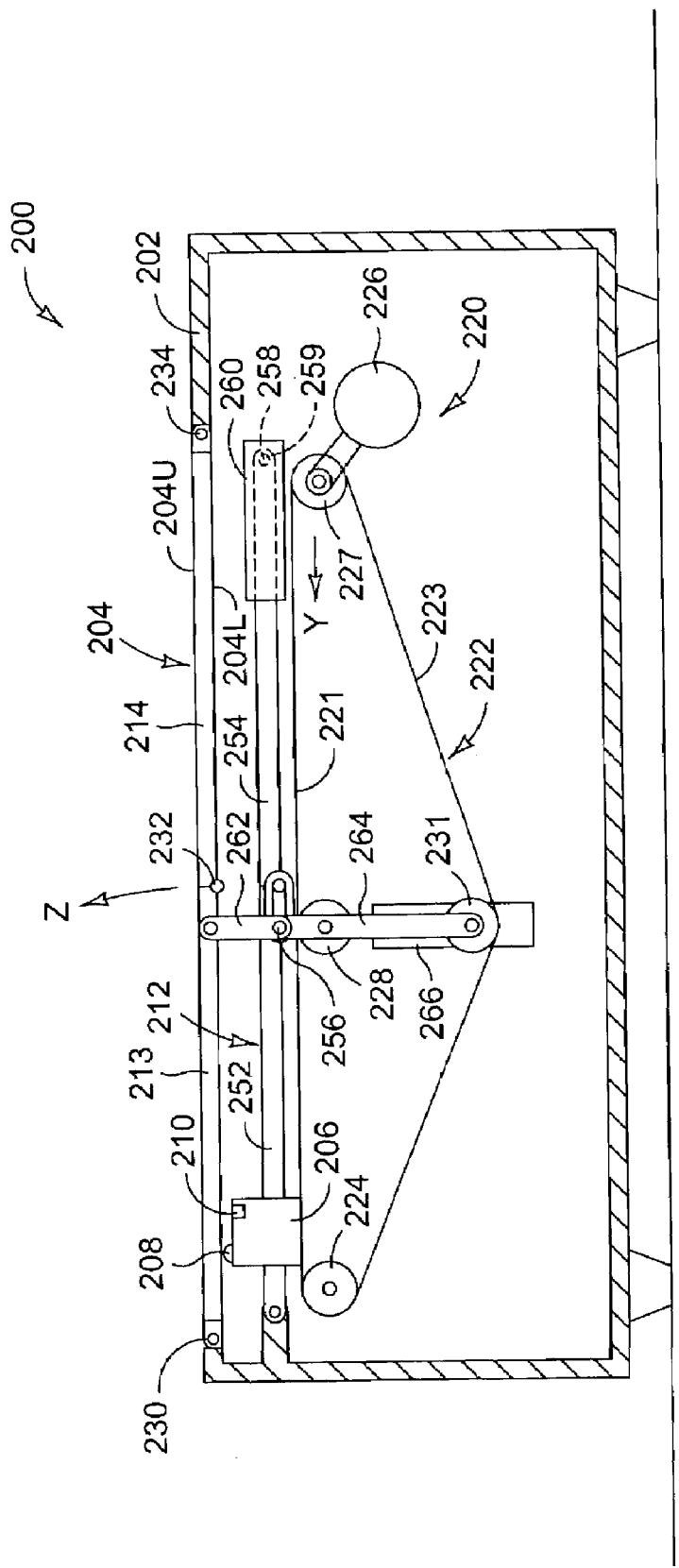
FIG. 4 is a side sectional view of the scanner depicted in FIG. 3.

Turning briefly to FIG. 4, the scanner 200 of FIG. 3 is depicted in a side sectional view. As depicted in FIG. 4, the document scanner 200 also includes a scan head track 212 which is supported by the housing 202. The scan head track 212 is configured to moveably support the scan head 206. The scan head track 212 includes a first track portion, 252, a second track portion 254, and a track hinge 256 joining the first and second track portions. As can be seen in FIG. 4, the scan head 206 can include a light source 208 and a receptor 210, which can operate in a manner described with respect to light source 108 and receptor 110 of FIG. 2.

Returning to FIG. 3, the platen first portion 213 is defined by a first edge 219. The platen 204 further includes a first platen portion hinge 230 which hinges the first platen portion 213 at the first edge 219 to the housing 202. The first platen portion hinge 230 thus allows the first platen portion 213 to rotate in a counter-clockwise direction with respect to the housing 202, while remaining secured to the housing 202. Accordingly, a first end 219 of the platen 204 is maintained in relatively fixed position to the housing 202 regardless of the position in which the platen 204 is placed. As also depicted in FIG. 3, the second platen portion 214 is defined by a second edge 217 which is opposite the first edge 219 of the platen 204. The document scanner 200 can further include a platen tracks 236 supported by the housing 202 near the front edge 214F and rear edge 214R of the platen second portion 214. The platen tracks 236 are configured to moveably support the second platen portion 214 at the second edge 217 of the platen 204. Thus, as the mating edges 215 of the first and second platen portions 213, 214 move in direction "Z", while the first edge 219 of the platen 204 is constrained in the "Z" direction by the hinge 230 (supported within the housing 202), the second edge 217 of the platen 204 will be able to move in direction "Y", thus allowing the platen 204 to assume a wedge-shape relative to the housing 202. The platen tracks 236 can define a constraining groove 239 (only one of which is depicted in the rear platen track 236), and the platen second portion 214 can support constraining pins 234 (only one of which is depicted near the front edge 214F of the platen second portion 214). The constraining pins 234 are configured to be received within the constraining grooves 239 of the platen tracks 236 proximate the forward edge 214F of the second platen portion 214. The restraining pins 234 and the restraining grooves 239 of the platen tracks 236 act in concert to restrain movement of the second edge 217 of the platen 204 in the "Z" direction, while allowing movement of the second edge 217 of the platen 204 in the "Y" direction. In this way, as the mating edges 215 of the platen first and second portions 213, 214 move in direction "Z", the second edge 217 of the platen 204 will be able to move in direction "Y", thus allowing the platen 204 to achieve a wedge-shaped configuration.

Figure 5:
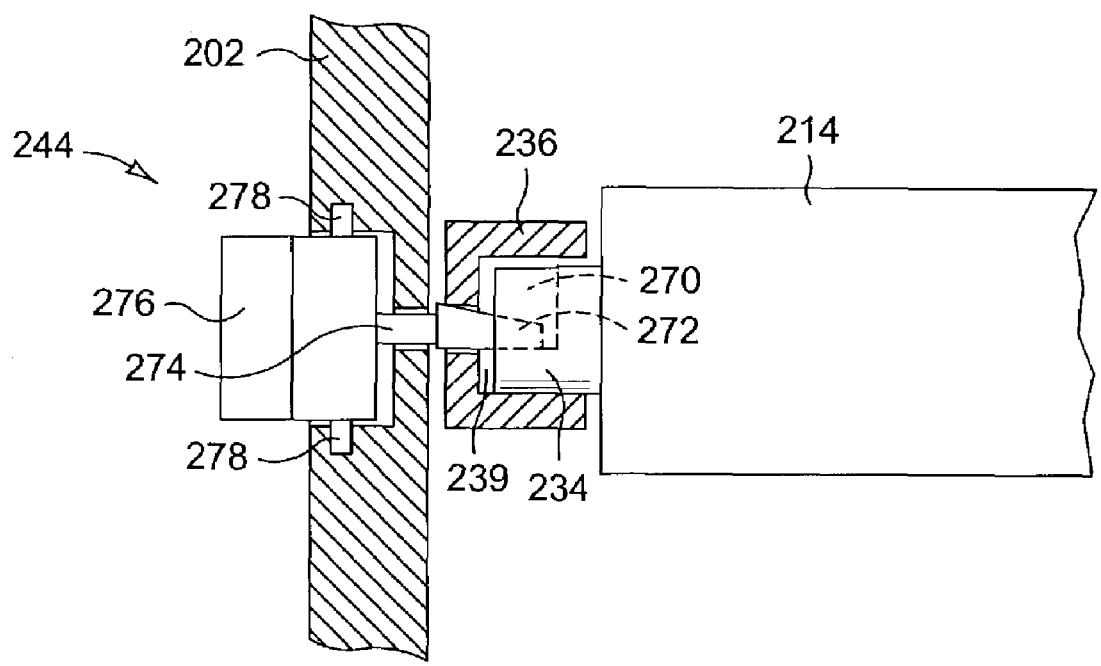
FIG. 5 is a front view depicting a platen lock device which can be used in the scanner depicted in FIG. 3.

The document scanner 200 can further include a platen lock 244 which is configured to secure the second edge 217 of the second platen portion 214 relative to the platen track 236. Turning to FIG. 5, a front view of one example of a platen lock 244 of FIG. 3 is depicted. In the example depicted in FIG. 5, the platen lock 244 includes a toggle switch 276 which is supported by the housing 202 by pivot pins 278. The toggle switch 276 is connected to a shaft 274, which in turn supports lock member 272. Lock member 272 is rotatably supported by shaft 274. The lock member 272 is received within a groove or slot 270 within constraining pin 234, which is in turn attached to platen second member 214. Thus, as pin 234 moves in direction "Y" (FIG. 3), the lock member 272 will remain properly oriented (i.e., will not rotate) with respect to the toggle switch 276. The constraining pin 234 and the lock member 272 are received within the constraining groove 239 of the platen track 236. When the toggle switch is moved from the "unlock" position depicted in FIG. 5 to an alternate "lock" position, the toggle switch 276 will push the shaft 274 rightward (with respect to FIG. 5). The lock member 272 will thus be forced into the constraining groove 239 of the platen track 236, thereby securing the second edge (217, FIG. 3) of the platen second portion 214 in a fixed position relative to the housing 202. The lock member 272 can be fabricated from a resilient material, such as rubber, to more effectively engage the platen track 236 when the platen lock 244 is actuated.

Returning to FIG. 3, the document scanner 200 can further include a platen release 251 supported by the housing 202 and configured to exert a force on the lower surface 204L of the platen 204 proximate the platen vertex hinge 232, to thereby urge the first and second platen portions (213, 214) in a direction "Z" away from the housing 202 when the first and second platen portions are initially arranged in a generally flat plane relative to one another (as depicted by first and second platen portions 213, 214). As depicted in FIG. 3, the platen release 251 includes a user actuatable platen release button 238, supported by housing 202. When the button 238 is pushed in direction "T", it will act on a pusher 240 which is pivotally hinged to the housing 202. The pusher 240 will in turn push a deployment member 242 (attached to platen second member 214) in direction "Z", thus pushing the platen vertex hinge 232 away from the housing 202. A user can then grasp the exposed edges 214F, 214R of the platen second member 214 and pull the platen 204 into the desired position, thereafter locking the platen into the desired position using the platen lock 244 (described above).

Turning again to FIG. 4, a side sectional view of the scanner 200 is depicted. As previously described, the scanner 200 is provided with a scan head track 212 which includes a first track portion, 252, a second track portion 254, and a track hinge 256 joining the first and second track portions. As depicted, the scanner 200 can further include a connecting link 262 connecting the platen vertex hinge 232 to the track hinge 256. The connecting link 262 is pivotally connected to the platen vertex hinge 232 and the track hinge 256. In this way, as the platen vertex hinge 232 is moved in direction "Z" to deploy the platen 204 to a wedge-shape, the first and second track portions 252, 254 will follow in concert, thus placing the first and second track portions 252, 254 of the scan head track 212 in general parallel orientation to the respective first and second portions 213, 214 of the platen 204. A scan head guide rail 260 can be provided to guide the free end 259 of the second track portion 254 in direction "Y" relative to the housing 202. A guide pin 258, supported by the second track portion 254, can be received within a slot (not shown) in the scan head guide rail 260 to constrain movement of the second track portion 254 to direction "Y", and preventing movement of the free end 259 of the second track portion 254 in direction "Z".

As further depicted in FIG. 4, the document scanner 200 can further include a scan head drive assembly 220 which is supported by the housing 202 and which is configured to move the scan head 206 along the scan head track 212. The scan head drive assembly 220 includes a drive cable 222 which is engaged by the scan head 206. The drive cable 222 defines a first cord length 221 and second cord length 223, which are generally separated by drive pulleys 224 and 227. Drive pulley 227 can be driven by motor 226, thus providing motive power to the scan head 206. A first idler 228 is in contact with the first cord length 221, and a second idler 231 is in contact with the second cord length 223. An idler arm 264 supports the first and second idlers (228, 231) in spaced-apart relationship to thereby hold the first and second cord lengths (221, 223) in spaced-apart relationship. The idler arm 264 is connected to at least one of the platen vertex hinge 232 or the track hinge 256. An idler guide member 266 can be provided to guide the second idler 231 in direction "Z" to thus prevent incidental movement of the second idler 231 in direction "Y" (or in the direction opposite to direction "Y"). Thus, as the platen vertex hinge 232 (or the track hinge 256) is moved in direction "Z" to deploy the platen 204 to a wedge-shape, the drive cable 222 will be adjusted accordingly to allow the scan head 206 to be driven along the first and second track portions 252, 254. The scan head 206 will thus be driven by the drive system 220 in a direction essentially parallel to the lower surface 204L of the platen 204, thereby allowing opposing first and second pages ("P1", "P2", FIG. 2) of an open book "B" to be scanned by the scan head 206 and allowing a relatively accurate facsimile of the pages "P1" and "P2" to be reproduced, even within the crease area "C" of the book "B".

Figure 6:
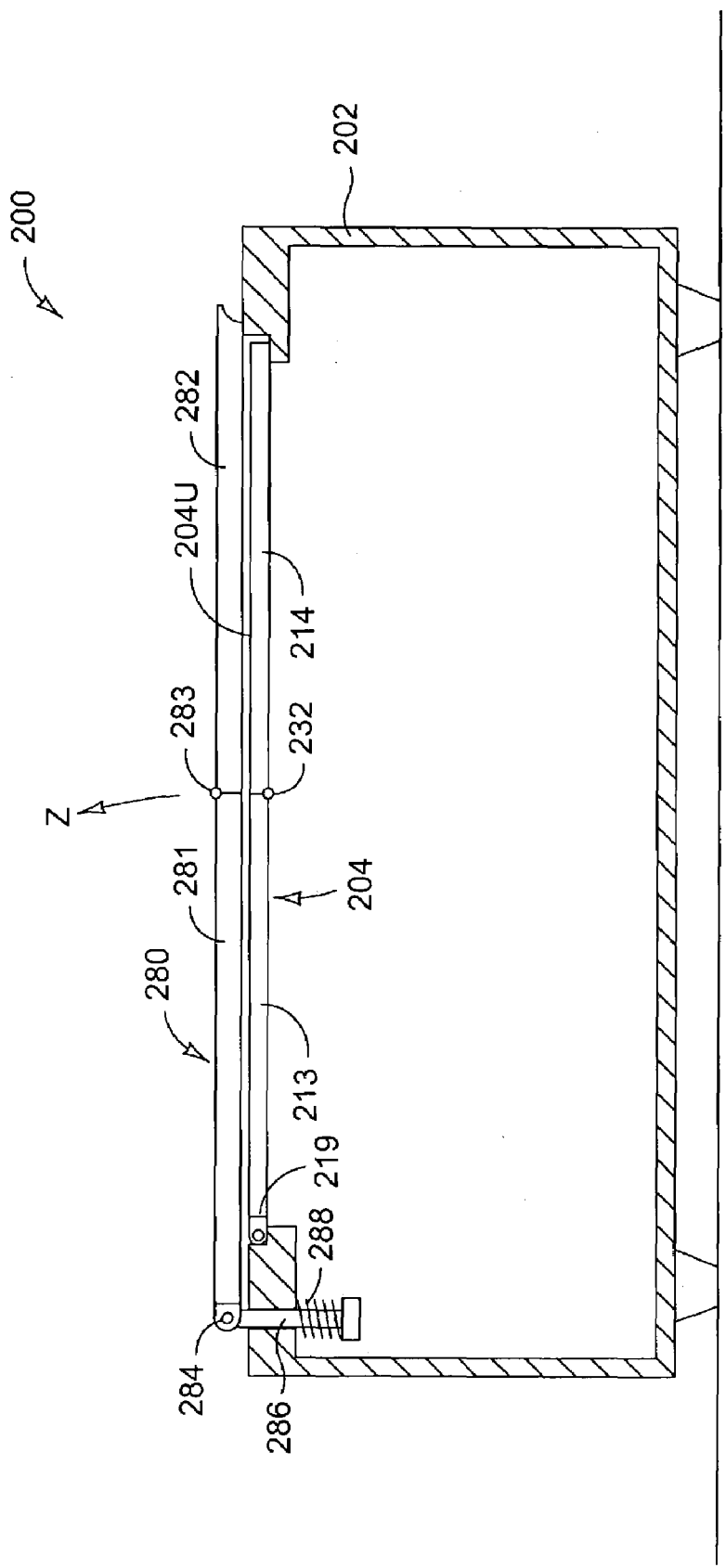
FIG. 6 is a side sectional view of the scanner depicted in FIG. 3 depicting a platen cover added to the scanner.

Turning now to FIG. 6, another side elevation view of the document scanner 200 of FIG. 3 is depicted. As depicted, the scanner 200 can further include a platen cover 280. The platen cover 280 can be hingedly attached to the scanner housing 202 by a platen cover hinge 284, which is located proximate the first end (or first edge) 219 of the platen 204. The platen cover 280 generally covers the upper surface 204U of the platen 204. The platen cover 280 can include a first cover portion 281 and a second cover portion 282 which are hingedly connected to one another by a platen cover vertex hinge 283. The platen cover vertex hinge 283 is preferably located proximate the platen vertex hinge 232 such that the first and second cover portions 281, 282 of the platen cover 280 generally cover the respective first and second platen portions 213, 214 of the platen. The platen cover 280 can thus reduce light intrusion to the platen 204 (and thus the reflected light receptor 210, FIG. 4) resulting in a higher quality image than if no platen cover is provided.

Figure 7:
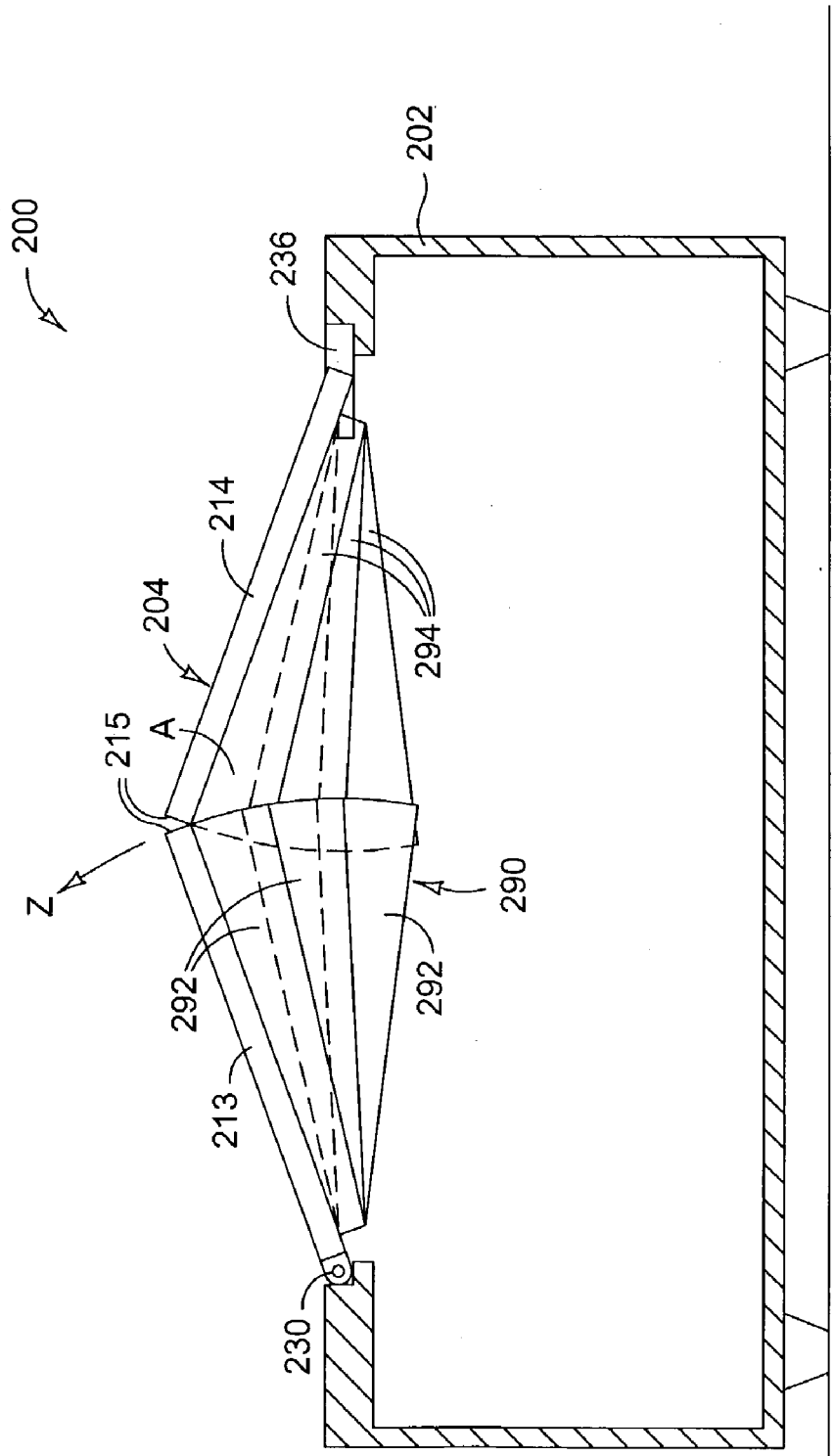
FIG. 7 is a side sectional view of the scanner depicted in FIG. 3 depicting a light seal added to the scanner.

Turning now to FIG. 7, yet another side elevation view of the document scanner 200 of FIG. 3 is depicted. As depicted, the scanner 200 can further include a deployable light seal 290 which is configured to be deployed as the mating edges 215 of the first and second platen portions (213, 214) move in an upward direction "Z" away from the housing 202. The light seal 290 is configured to fill a generally triangular shaped open area "A" defined by the first and second platen portions 213, 214 and the housing 202 as the mating edges 215 of the first and second platen portions 213, 214 move in an upward direction ("Z") away from the housing 202. The light seal 290 reduces stray incident light from entering into the scanner in the area "A". The light seal 290 can further act as a dust barrier to reduce intrusion of dust and other particles into the interior of the scanner housing 202. As depicted in FIG. 7, the light seal 290 is formed from a series of overlapping shutters 292, 294. In another configuration, the light seal can be in the form of an expansible curtain.

Figure 8:
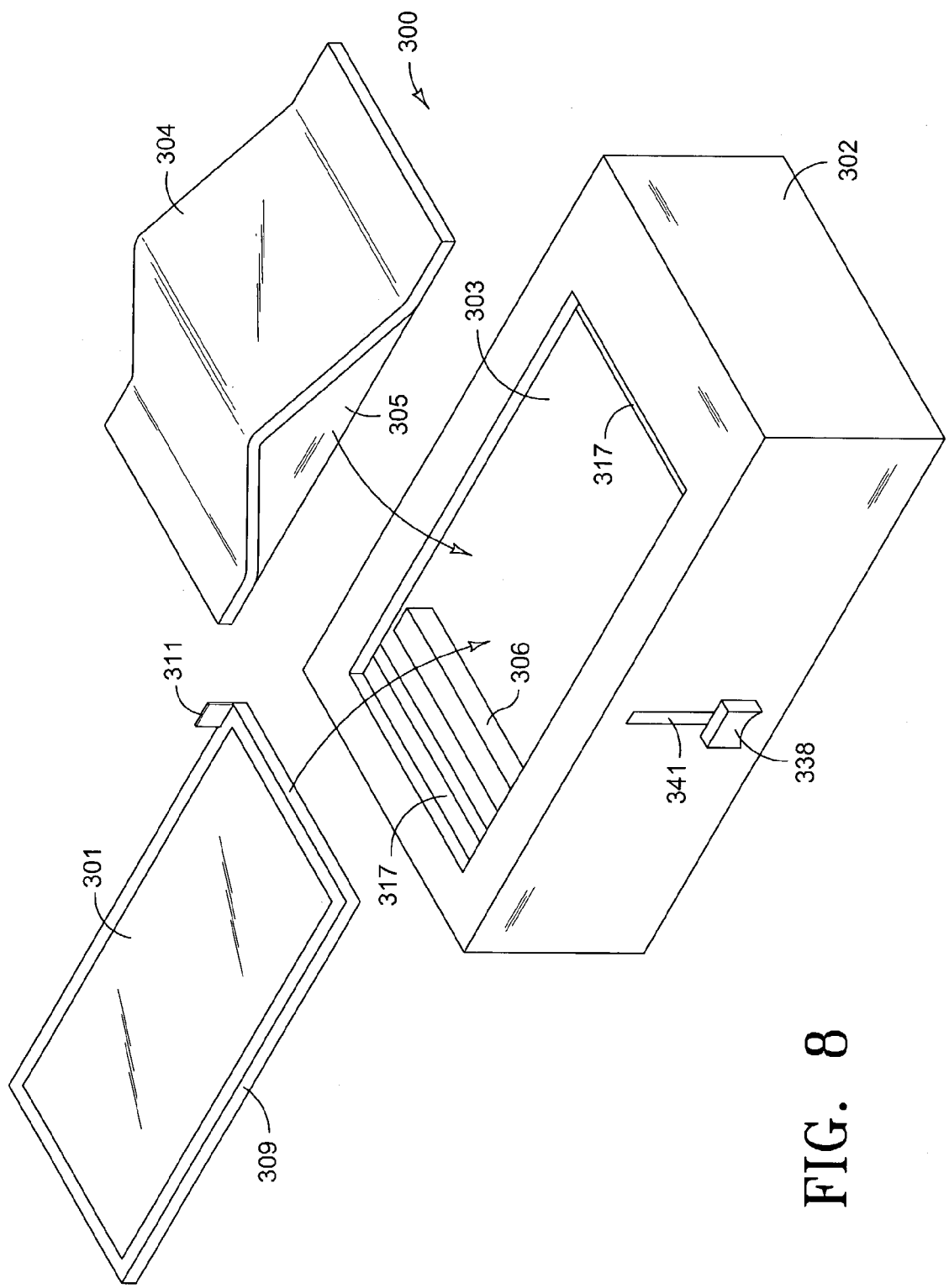
FIG. 8 is an isometric diagram depicting a scanner configured to scan an open book, in accordance with a further embodiment of the present invention.

FIG. 8 is an isometric diagram depicting another embodiment of the present invention. FIG. 8 depicts a document scanner 300 that includes interchangeable transparent first and second platens 301, 304. The first platen 301 is a generally flat planar platen which can be used for scanning relatively flat objects (such as a sheet of paper). The second platen 304 is a generally wedge-shaped platen which can be used for scanning an open book in the manner described above with respect to FIG. 2. The document scanner 300 includes a housing 302, and each platen 301, 304 is configured to be supported by the housing. The housing 302 defines an open area 303 having support members 317 at each end thereof to support the interchangeable platens 301, 304 within the open area 303. The generally flat platen 301 can be provided with a lift tab 311 to facilitate removal of the platen from the housing 302. Further, a non-transparent holding surface 309 can be placed around the peripheral edge of the flat platen 301 so that a user can avoid touching the transparent central glass area of the platen while inserting the platen into, or removing the platen from, the housing 302. The wedge-shaped platen 304 can be provided with an opaque sidewall 305 to reduce light intrusion into the open area 303 when the wedge-shaped platen is placed on the housing 302. The sidewall 305 can also reduce dust and the like from entering the open area 303 when the platen 304 is in place. The scanner 300 further includes a scan head 306 which is moveably supported by the housing 302 and which can move across the open area 303 to thereby scan items placed on either of the platens 301, 304.

Figure 9:
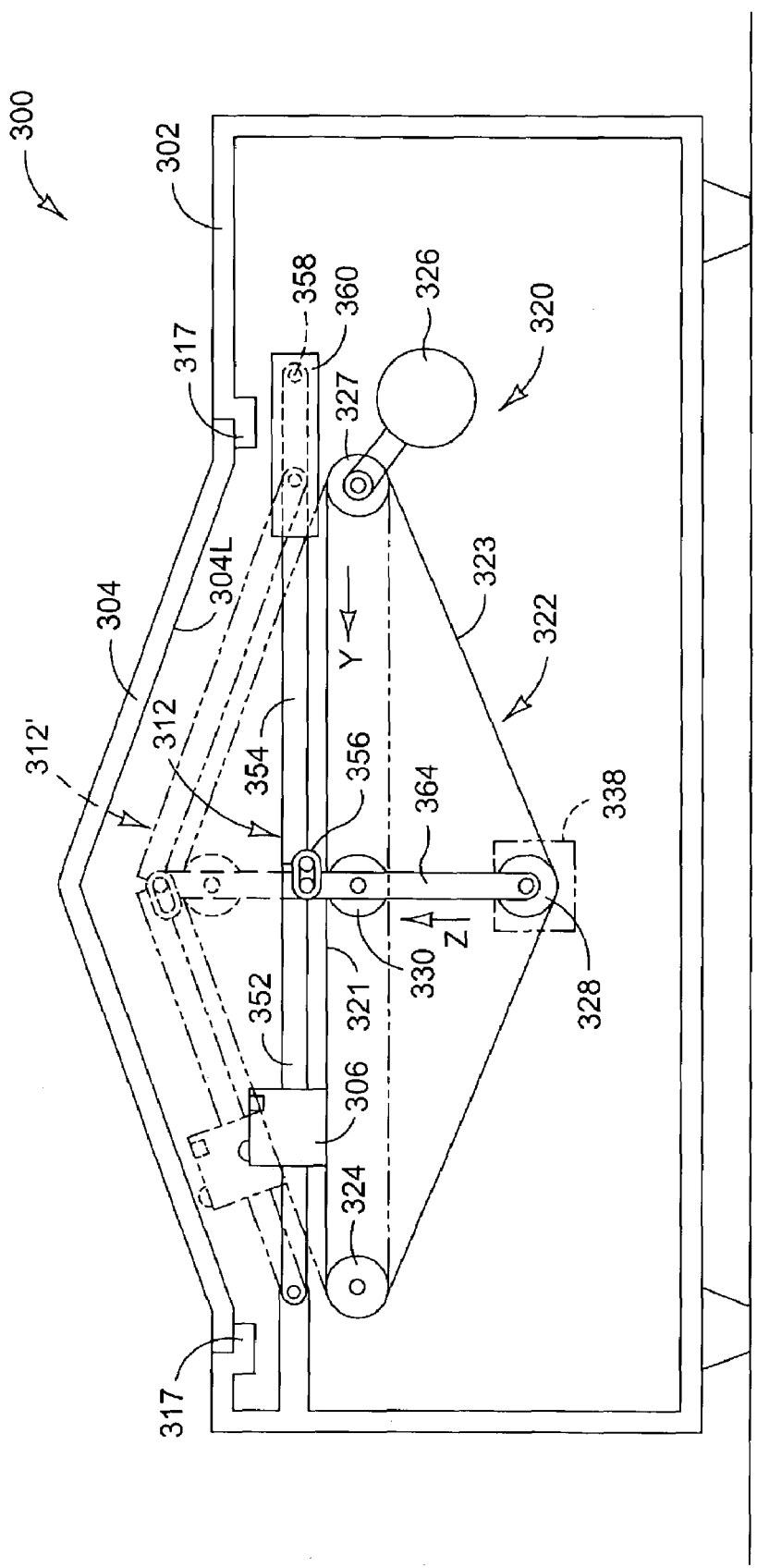
FIG. 9 is a side sectional view of the scanner depicted in FIG. 8.

Turning to FIG. 9, a side sectional view of the scanner 300 of FIG. 8 is depicted with the wedge-shaped platen 304 placed on the platen supports 317. The scanner 300 includes a scan head track 312 which is supported by the housing 302 and which is configured to moveably support the scan head 306. The scan head track 312 includes a first track portion 352, a second track portion 354, and a track hinge 356 joining the first and second track portions. The first track portion 352 can be pivotally supported at its free end by the housing 302, and second track portion 354 can be pivotally supported in the housing by a slide guide 360. The second track portion 354 can be fitted with a guide pin 358 which can be received within a horizontal slot or channel in the slide guide, thus allowing the free end of the second track portion 354 to move in direction "Y" as the track hinge 356 is moved upward in direction "Z". In this way, the guide track 312 can be deployed from the flat position depicted in FIG. 9 to a wedge-shaped position depicted by phantom lines as 312'. In the deployed position, the scan head track 312' can guide the scan head 306 along a path under the platen 304 in directions essentially parallel to the book support surfaces of the platen, thus allowing for improved scanning of an open book placed over the wedge-shaped platen 304.

As depicted in FIGS. 8 and 9, the scanner 300 can further include a scan head track actuator 338 which is configured to slide in a slot 341 in the front of the housing 302. The track actuator 338 is connected to the track hinge 356 to thereby allow a user to move the track hinge in a generally upward direction "Z", thereby placing the first and second track portions 352, 354 in a generally inverted "V" position relative to one another (as indicated by scan head track 312' in phantom lines).

As depicted in FIG. 9, the scanner 300 can also include a scan head drive assembly 320 supported within the housing 302 and configured to move the scan head 306 along the scan head track 312. The scan head drive assembly includes a drive cable 322 which is engaged by the scan head 306. The drive cable 322 defines a first cord length 321 and second cord length 323, which are generally separated by drive pulleys 324 and 327. Drive pulley 327 can be driven by motor 326, thus providing motive power to the scan head 306. A first idler 330 is in contact with the first cord length 321, and a second idler 328 is in contact with the second cord length 323. An idler arm 364 supports the first and second idlers (330, 328) in spaced-apart relationship to thereby hold the first and second cord lengths (321, 323) in spaced-apart relationship. The idler arm 364 is connected to the track hinge 356. Thus, as the track hinge 356 is moved in direction "Z" by deployment actuator 338 to deploy the scan head track 312 to a wedge-shape (as depicted in phantom lines by 312'), the drive cable 322 will be adjusted accordingly to allow the scan head 306 to be driven along the first and second track portions 352, 354. The scan head 306 will thus be driven by the drive assembly 320 in a direction essentially parallel to the lower surface 304L of the platen 304, thereby allowing opposing first and second pages of an open book to be scanned by the scan head 306 and allowing a relatively accurate facsimile of the pages to be reproduced.

Figure 10:
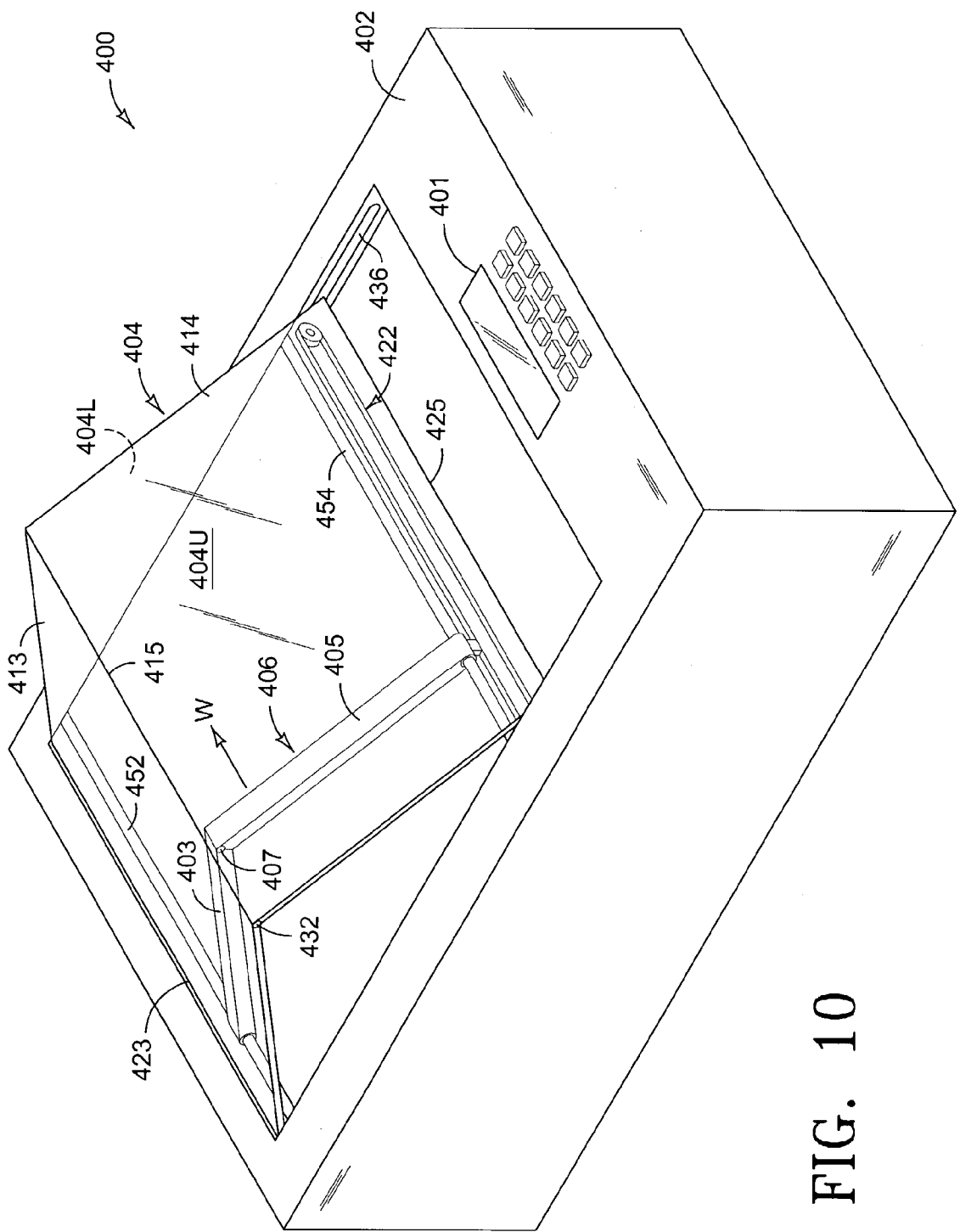
FIG. 10 is an isometric diagram depicting a scanner configured to scan an open book, in accordance with yet another embodiment of the present invention.

FIG. 10 is an isometric diagram depicting a scanner 400 configured to scan an open book, in accordance with yet another embodiment of the present invention. The document scanner 400 further includes a housing 402 which supports a transparent platen 404. The platen 404 defines an upper surface 404U and a lower surface 404L. The platen 404 includes a first platen portion 413, a second platen portion 414 which intersect at a vertex 415 to thereby define a wedge-shaped platen 404. As depicted, the first and second platen portions 413, 414 are joined at the vertex 415 by a platen vertex hinge 432. A first edge 423 of the platen 404 can be pivotally attached to the housing 402, while an opposite second edge 425 of the platen can be moveably secured in platen guide track 436. It will thus be appreciated that platen 404 depicted in FIG. 10 is very similar to the platen 204 depicted in FIG. 3. The platen 404 can thus be moved from a flat position (relative to housing 402) to the wedge-shaped position depicted in FIG. 10. However, platen 404 can also be fixed in the wedge-shaped position, similar to platen 104 of FIG. 2.

The document scanner 400 further includes a wedge-shaped scan head 406 which is moveably supported by tracks 452 and 454 and is configured to move generally parallel to the lower surface 404L of the platen 404 in direction "W". The direction of movement of the scan head 406 of the scanner 400 should be compared with the direction of movement of the scan head 106 of the scanner 100 (FIG. 2). That is, scan head 406 (FIG. 10) moves parallel to the first and second edges 423, 425 of the platen 404, whereas the scan head 106 (FIG. 2) moves in a direction perpendicular to the edges of the platen 104 which are proximate the scanner housing 102. The scan head 406 (FIG. 10) thus is a two-part scan head, having a first scan head segment 403 and a second scan head segment 405 which are joined at a vertex proximate to the vertex 415 of the platen 406. When the platen 404 is hinged so as to be capable of being deployed from a flat position to a wedge-shaped position, then the first scan head segment 403 and the second scan head segment 405 can be joined by a scan head hinge 407. The scan head 406 can contain a single, wedge-shaped light source (such as a bent light tube—not shown) when the scan head 406 is fixed in the wedge-shaped position. However, when the scan head 406 is capable of being deployed from a flat shape to a wedge shape, then the scan head can contain two separate light sources (not shown), each light source being placed in one of the first or second scan head segments 403, 405. While a separate CCD array (not shown) can be provided for each of the two scan head segments 403, 405, by appropriately placed prisms and mirrors (not shown), light reflected from a book (not shown) placed over the wedge-shaped platen 404 can be directed to a single CCD array (not shown). Further, via a user interface 401, a user can instruct the scanner 400 to scan either the left or right page of a book, or both pages. This can be accomplished, for example, by activating only those cells of the CCD array necessary to capture the selected page, or activating all of the cells to capture both pages.

The scan head 406 moves along scan head tracks or guides 452 and 454. Scan head guide 452 is located proximate to, and parallel to, the first edge 423 of the platen 404, and scan head guide 454 is located proximate to, and parallel to, the second edge 425 of the platen 404. The scan head first segment 403 is supported at a first end of the scan head 406 by the scan head guide 452, and scan head second segment 405 is supported at a second end of the scan head by the scan head guide 454. A scan head drive assembly 422 (depicted here as a cable-pulley system) can be used to pull the scan head 406 along the scan head tracks 452, 454. Although only a single scan head drive assembly 422 is depicted, a second scan head drive assembly can also be located near the first edge 423 of the platen 404 so that both ends of the scan head 406 can be driven simultaneously. It will be appreciated that the scan head drive assembly 422 is a reversible drive assembly to allow the scan head 406 to move in direction "W" and in the opposite direction as well.

We claim:

1. A document scanner for scanning an open book, comprising:
   a housing;
   a wedge-shaped transparent platen supported by the housing and defining an upper surface configured to support a book in a face-down position, the platen further defining a lower surface opposite the upper surface, the platen comprising a first platen portion and a second platen portion joined at a vertex to thereby define the wedge-shape of the platen; and
   a scan head moveably supported by the housing, the scan head being configured to move generally parallel to the first platen portion and the second platen portion;
   and wherein the scan head is further configured to move firstly generally parallel to the first platen portion in a first direction, and then, after moving past the vertex of the platen, to move secondly generally parallel to the second platen portion in a second direction.

2. The document scanner of claim 1, and wherein:
   the platen defines a first end and a second end, and the platen is supported by the housing at the first and second ends of the platen;
   the vertex of the platen is generally parallel to the first and second ends of the platen; and
   the scan head is generally linear in shape, and is aligned generally parallel to the first and second ends of the platen.

3. A document scanner for scanning an open book, comprising:
   a housing;
   a wedge-shaped transparent platen supported by the housing and defining an upper surface configured to support a book in a face-down position, the platen further defining a lower surface opposite the upper surface, the platen comprising a first platen portion and a second platen portion joined at a vertex to thereby define the wedge-shape of the platen; and
   a scan head moveablv supported by the housing, the scan head being configured to move aenerallv parallel to the first platen portion and the second platen portion;
   and further comprising a scan head track supported by the housing and configured to moveably support the scan head, the scan head track comprising a first track portion, a second track portion, and a curved track vertex portion, and wherein:
   the first and second track portions are joined together by the curved track vertex portion; and
   the first and second track portions are generally parallel to the respective first and second platen portions.

4. The document scanner of claim 3, and further comprising a scan head drive assembly supported by the housing and configured to move the scan head generally parallel to the first and the second platen portions.

5. The document scanner of claim 4, and wherein the drive assembly comprises a drive cable generally arranged in a triangular shape, wherein a first and a second side of the triangle are generally parallel to the respective first and second track portions.

6. A document scanner, comprising:
   a housing;
   a transparent platen supported by the housing and defining an upper surface and a lower surface, the platen comprising a first platen portion, a second platen portion, and a platen vertex hinge, and wherein each platen portion defines a mating edge, and the first and second platen portions are joined at the mating edges by the platen vertex hinge to thereby allow the mating edges of the first and second platen portions to move generally upward and away from the housing;
   a scan head moveably supported by the housing and configured to move generally parallel to the lower surface of the platen;
   a scan head track supported by the housing and conflaured to moveably support the scan head, the scan head track comprising a first track portion, a second track portion, and a track hinge joining the first and second track portions;
   wherein the platen first portion is defined by a first edge, the platen further comprising a first platen portion hinge which hinges the first platen portion at the first edae to the housing;
   wherein the second platen portion is defined by a second edge which is opposite the first edge, the document scanner further comprising a platen track configured to moveably support the second platen portion at the second edge;
   and further comprising a platen lock configured to secure the second edge of the second platen portion relative to the platen track.

7. A document scanner, compnsing:
   a housing;
   a transparent platen supported by the housing and defining an upper surface and a lower surface, the platen comprising a first platen portion, a second platen portion, and a platen vertex hinge, and wherein each platen portion defines a mating edge, and the first and second platen portions are joined at the mating edaes by the platen vertex hinge to thereby allow the mating edaes of the first and second platen portions to move generally upward and away from the housing;
   a scan head moveably supported by the housing and configured to move generally parallel to the lower surface of the platen;
   a scan head track supported by the housing and configured to moveably support the scan head, the scan head track comprising a first track portion, a second track portion, and a track hinge joining the first and second track portions;
   wherein the platen first portion is defined by a first edge, the platen further comprising a first platen portion hinge which hinges the first platen portion at the first edge to the housing;

wherein the second platen portion is defined by a second edge which is opposite the first edge, the document scanner further comprising a platen track configured to moveably support the second platen portion at the second edge;

and further comprising a platen release supported by the housing and configured to exert a force on the lower surface of the platen proximate the platen vertex hinge to thereby urge the first and second platen portions away from the housing when the first and second platen portions are arranged in a generally flat plane relative to one another.

8. A document scanner, comprsing;

a housing;

a transparent platen supported by the housing and defining an upper surface and a lower surface, the platen comprising a first platen portion, a second platen portion, and a platen vertex hinge, and wherein each platen portion defines a mating edge, and the first and second platen portions are joined at the mating edges by the platen vertex hinge to thereby allow the mating edoes of the first and second platen portions to move generally upward and away fmm the housing;

a scan head moveably supported by the housing and configured to move generally parallel to the lower surface of the platen;

a scan head track supported by the housing and configured to moveably support the scan head, the scan head track comprising a first track portion, a second track portion, and a track hinge joining the first and second track portions;

wherein the platen first portion is defined by a first edge, the platen further comprising a first platen portion hinge which hinges the first platen portion at the first edge to the housing;

wherein the second platen portion is defined by a second edge which is opposite the first edge, the document scanner further comprising a platen track configured to moveably support the second platen portion at the second edge;

and further comprising a connecting link connecting the platen vertex hinge to the track hinge.

9. A document scanner, comprising:

a housing;

a transparent platen supported by the housing and defining an upper surface and a lower surface, the platen comprising a first platen portion, a second platen portion, and a platen vertex hinge, and wherein each platen portion defines a mating edge, and the first and second platen portions are joined at the mating edges by the platen vertex hinge to thereby allow the matin edges of the first and second platen portions to move generally upward and away from the housing;

a scan head moveably supported by the housing and configured to move generally parallel to the lower surface of the platen; and a scan head track supported by the housing and configured to moveably support the scan head, the scan head track comprising a first track portion, a second track portion, and a track hinge joining the first and second track portions;

a scan head drive assembly supported by the housing and conflaured to move the scan head along the scan head track;

and wherein the scan head drive assembly comprises:

a drive cable which is engaged by the scan head, the drive cable defining first and second cord lengths;

a first idler in contact with the first cord length;

a second idler in contact with the second cord length; and an idler arm supporting the first and second idlers in spaced-apart relationship to thereby hold the first and second cord lengths in spaced-apart relationship, and wherein the idler arm is connected to at least one of the platen vertex hinge or the track hinge.

10. A document scanner, comprising:

a housing;

a transparent platen supported by the housing and defining an upper surface and a lower surface, the platen comprising a first platen portion, a second platen portion, and a platen vertex hinge, and wherein each platen portion defines a mating edge, and the first and second platen portions are joined at the mating edges by the platen vertex hinge to thereby allow the mating edges of the first and second platen portions to move generally upward and away from the housing;

a scan head moveably supported by the housing and conflaured to move generally parallel to the lower surface of the platen; and a scan head track supported by the housing and configured to moveably support the scan head, the scan head track comprising a first track portion, a second track portion and a track hinge joining the first and second track portions:

and further comprising a deployable light seal configured to be deployed as the mating edges of the first and second platen portions move in an upward direction away from the housing and to fill a generally triangular shaped open area defined by the first and second platen portions and the housing as the mating edges of the first and second platen portions move in an upward direction away from the housing.

11. The document scanner of claim 10, and wherein the light seal comprises a plurality of overlapping shutters.

12. A document scanner, comprising:

a housing;

interchangeable transparent first and second platens each platen configured to be supported by the housing;

a scan head moveably supported by the housing;

a scan head track supported by the housing and configured to moveably support the scan head, the scan head track comprising a first track portion, a second track portion, and a track hinge joining the first and second track portions; and wherein:

the first platen is a generally flat planar platen; and the second platen is a generally wedge-shaped platen;

and wherein the scan head drive assembly comprises:

a drive cable which is engaged by the scan head, the drive cable defining first and second cord lengths;

a first idler in contact with the first cord length;

a second idler in contact with the second cord length; and an idler arm supporting the first and second idlers in spaced-apart relationship to thereby hold the first and second cord lengths in spaced-apart relationship, and wherein the idler arm is connected to the track hinge.

13. The document scanner of claim 12, and further comprising a scan head track actuator connected to the track hinge to allow a user to move the track head hinge in a generally upward direction, thereby placing the first and second track portions in a generally inverted "SI" position relative to another.

* * * * *

UNITED STATES PATENT AND TRADEMARK OFFICE
CERTIFICATE OF CORRECTION

| | | |
|---|---|---|
| PATENT NO. | : 7,268,923 B2 | |
| APPLICATION NO. | : 10/376432 | |
| DATED | : September 11, 2007 | |
| INVENTOR(S) | : Leonard Schroath et al. | |

It is certified that error appears in the above-identified patent and that said Letters Patent is hereby corrected as shown below:

In column 13, line 60, in Claim 3, delete "moveablv" and insert -- moveably --, therefor.

In column 13, line 61, in Claim 3, delete "aenerallv" and insert -- generally --, therefor.

In column 14, line 28, in Claim 6, delete "conflaured" and insert -- configured --, therefor.

In column 14, line 36, in Claim 6, delete "edae" and insert -- edge --, therefor.

In column 14, line 45, in Claim 7, delete "compnsing" and insert -- comprising --, therefor.

In column 14, line 52, in Claim 7, delete "edaes" and insert -- edges --, therefor.

In column 14, line 53, in Claim 7, delete "edaes" and insert -- edges --, therefor.

In column 15, line 13, in Claim 8, delete "comprsing" and insert -- comprising --, therefor.

In column 15, line 21, in Claim 8, delete "edoes" and insert -- edges --, therefor.

In column 15, line 23, in Claim 8, delete "fmm" and insert -- from --, therefor.

In column 15, line 51, in Claim 9, delete "matin" and insert -- mating --, therefor.

In column 15, line 63, in Claim 9, delete "conflaured" and insert -- configured --, therefor.

UNITED STATES PATENT AND TRADEMARK OFFICE
CERTIFICATE OF CORRECTION

PATENT NO. : 7,268,923 B2
APPLICATION NO. : 10/376432
DATED : September 11, 2007
INVENTOR(S) : Leonard Schroath et al.

It is certified that error appears in the above-identified patent and that said Letters Patent is hereby corrected as shown below:

In column 16, line 21, in Claim 10, delete "conflaured" and insert -- configured --, therefor.

In column 16, line 25, in Claim 10, after "portion" insert -- , --.

In column 16, line 27, in Claim 10, delete ":" and insert -- ; --, therefor.

In column 16, line 40, in Claim 12, after "platens" insert -- , --.

In column 16, line 64, in Claim 13, delete "SI" and insert -- V --, therefor.

In column 16, line 65, in Claim 13, after "to" insert -- one --.

Signed and Sealed this

Fifth Day of May, 2009

JOHN DOLL
*Acting Director of the United States Patent and Trademark Office*